(12) United States Patent
Tsui et al.

(10) Patent No.: US 9,343,990 B2
(45) Date of Patent: May 17, 2016

(54) LOW CURRENT CONSUMPTION ELECTRICAL CONTROL SWITCH

(76) Inventors: Philip Yu Wing Tsui, Fo Tan (HK); Gallen Ka Leung Tsui, Brampton (CA)

(*) Notice: Subject to any disclaimer, the term of this patent is extended or adjusted under 35 U.S.C. 154(b) by 462 days.

(21) Appl. No.: 13/233,240

(22) Filed: Sep. 15, 2011

(65) Prior Publication Data

US 2012/0063186 A1 Mar. 15, 2012

(30) Foreign Application Priority Data

Sep. 15, 2010 (CA) ..................................... 2714458

(51) Int. Cl.
| | |
|---|---|
| H02M 1/00 | (2007.01) |
| H02M 5/257 | (2006.01) |
| H05B 37/02 | (2006.01) |
| H05B 39/08 | (2006.01) |
| H02J 13/00 | (2006.01) |

(52) U.S. Cl.
CPC ......... H02M 5/2576 (2013.01); H05B 37/0272 (2013.01); H05B 39/08 (2013.01); *H02J 13/0075* (2013.01); *H02M 2001/0006* (2013.01); *Y02B 70/3283* (2013.01); *Y04S 20/246* (2013.01)

(58) Field of Classification Search
CPC ........ H02J 9/02; H02J 9/065; H05B 37/0272; H05B 37/0227; H05B 33/0842
USPC ................ 307/139–140, 116, 125, 131, 104; 363/126–128
See application file for complete search history.

(56) References Cited

U.S. PATENT DOCUMENTS

| | | | |
|---|---|---|---|
| 7,863,777 B2 * | 1/2011 | Tsui et al. ...................... | 307/139 |
| 2004/0218699 A1 * | 11/2004 | Carsello ......................... | 375/343 |

(Continued)

FOREIGN PATENT DOCUMENTS

| | | |
|---|---|---|
| EP | 0867826 A2 | 9/1998 |
| EP | 884706 A1 * | 12/1998 |

(Continued)

OTHER PUBLICATIONS

DERWENT-ACC-No. 2010-A20074; "Universal and simple remote controller for switch regulation and control signal transmission of e.g. switch-type electric light, has low voltage detecting circuit whose output terminal is connected with wireless integrated control chip".

(Continued)

*Primary Examiner* — Adolf Berhane
*Assistant Examiner* — Henry Lee, III (57) ABSTRACT

The invention provides a low current consumption control switch device and method related thereto. The control switch device includes a switch control component, a microprocessor, a wireless signal receiver for receiving control signal and a DC power supply. The DC power supply draws an AC current from the AC power supply to power the wireless signal receiver, the microprocessor and the switch control component. The switch control component has a control input for receiving control instructions to control current supply from the AC power supply. The microprocessor is operatively connected to the switch control component for providing control instructions to alter its switching state. The control signal comprises a preamble and a message portion. The wireless signal receiver is configured to alternate between at least two current consumption modes and to remain in a higher current consumption mode upon detection of the preamble.

15 Claims, 4 Drawing Sheets

(56) References Cited

U.S. PATENT DOCUMENTS

| | | | |
|---|---|---|---|
| 2005/0162265 A1* | 7/2005 | Werner et al. | 340/468 |
| 2007/0135079 A1* | 6/2007 | Bromley | 455/343.1 |
| 2010/0141153 A1* | 6/2010 | Recker et al. | 315/149 |
| 2010/0202161 A1* | 8/2010 | Sims et al. | 363/20 |
| 2010/0327766 A1* | 12/2010 | Recker et al. | 315/291 |
| 2011/0012528 A1* | 1/2011 | Tsui et al. | 315/291 |
| 2011/0254722 A1* | 10/2011 | Naiki | 341/173 |

FOREIGN PATENT DOCUMENTS

| | | | |
|---|---|---|---|
| JP | 62-224193 A | | 10/1987 |
| JP | 05-325627 A | | 12/1993 |
| JP | 2006/134842 A | | 5/2006 |
| JP | 2010093771 A | * | 4/2010 |

OTHER PUBLICATIONS

DERWENT-ACC-No. 2010-F04016; "Multi-functional wireless remote and manual light controlling switch for use in home, has voltage reduction circuit whose two ends are linked with middle relay closed and opened contact and closed and opened contact of double control switch".

* cited by examiner

LOW CURRENT CONSUMPTION ELECTRICAL CONTROL SWITCH

FIELD OF INVENTION

The invention relates generally to the field of electric control switches. In particular, the invention relates to a low current consumption electrical control switch and method related thereto.

BACKGROUND OF INVENTION

Home automation has been growing for many years. Home automation includes lighting control, heating, ventilation and air-conditioning (HVAC) control, remote controlled sprinkler for irrigation, intelligent alarm system etc. Wireless home automation has gained its popularity in recent years in part due to its relative easy installation in comparison to a hardwired one. These wireless devices require wiring for power, if they are not operated by battery. Compared to hardwired home automation system, many wireless home automation systems aim for Do-It-Yourself market because they typically can be installed easily. There are specific wireless protocols developed for home automation, such as Z-wave™, Zig-Bee™ Insteon™ etc. One popular application for wireless home automation system is lighting control. Among all lighting control devices, wall switch controlled lightings are perhaps the most popular because these switches are installed in millions of buildings and most lighting in residential houses are operated by wall switches. Therefore the demand for wall switch operated lighting control in home automation field is very high.

In order to convert a traditional wall switch to one that can be controlled wirelessly, a wall switch module is required. A wall switch module replaces an existing wall switch. Such wall switch module includes a wireless receiver to receive signal from a controller such as a remote control, and typically also has relay or triac output to control brightness or lighting on/off. Wall switch module requires alternating current (AC) power to operate. Typical operating current for a wall switch module is around 10 mA-20 mA. One AC power supply would come from the live and neutral connections of household power supply. However, most wall switch boxes do not have a neutral connection. Generally only 2 wires are fed into a wall switch box: a live feed from the AC power supply to the switch, and a wire extending from the switch to a load. In most cases, the other side of the load is connected directly to the neutral of the AC power supply without returning to the switch box. In other words, a typical switch box is provided with only a live feed but no neutral to connect to a wall switch module to complete the circuit. To run a neutral wire back to such a switch box tends to be costly if such neutral wire was not installed in the first place. This is due to the limited access to existing wirings. Therefore, there is a need for a wall switch module that can operate with the existing wirings in the switch box, even without a neutral connection.

It is known to provide lighting control products for wall switch control without a neutral connection. Such a wall switch module itself is treated as a load, connected in series with the load to be switched, which would be turned on partially in order to conduct current but the current conducted therethrough is kept at minimum so the load is still practically kept in an "off" state. The wall switch module must operate with this minimal current. In order to turn on a conventional incandescent load, such as a tungsten bulb, a required current must flow through the load. For example, the required current is around 40 mA for a 10 W bulb. For a conventional incandescent bulb and with a current less than 40 mA, the bulb would remain in the off state. The wall switch module could draw a current as much as 30 mA to maintain its operation without switching on the tungsten bulb. However, compact fluorescent light (CFL) tends to be much more sensitive to the conducted current. With only 200 μA flowing through, a compact fluorescent light could flash randomly instead of remain in the off state. Thus, only 200 μA, far below the threshold for switching on a tungsten bulb, could have undesirable impact to the normal operation of CFL. This makes it difficult or not possible to have the wall switch module to draw current the same way if the load is a compact fluorescent load. Recently, compact fluorescent lamp is becoming more popular due to its low energy consumption compared to traditional tungsten bulb. Some countries have already indicated gradual phase out of tungsten bulbs. Thus, there is a need to have a wall switch module for replacing a conventional switch but without having undesirable impact on the normal operation of CFL and fluorescent light.

There is a need for an improved design of wall switch which can work on various different types of loads, such as incandescent load, fluorescent load, CFL, even motor loading etc, without the need to have a neutral connection.

The forgoing creates challenges and constraints for a wall switch for replacing a conventional wall switch. There is therefore a need for an improved wall switch as compared to the existing art. It is an object of the present invention to mitigate or obviate at least one of the above mentioned disadvantages.

SUMMARY OF INVENTION

The present invention relates to a low current consumption electrical control switch and method related thereto. In general terms, there is provided a very low power switching circuit that is adapted to be used to switch loads such as building lighting circuits and HVAC circuits.

In one aspect of the invention, there is provided a control switch device for connection between an AC power supply and a load to be controlled by the control switch module. The control switch device includes a switch control component, a microprocessor, a wireless signal receiver for receiving control signal and a direct current (DC) power supply. The DC power supply draws an AC current from the AC power supply to convert the AC current to a DC output to power the wireless signal receiver, the microprocessor and the switch control component. The switch control component has a control input for receiving control instructions to alter switching state of the switch control component to control current supply from the AC power supply to the load. The microprocessor is operatively connected to the control input of the switch control component for providing the control instructions The control signal comprises a preamble and a message portion. The wireless signal receiver is configured to alternate between at least two current consumption modes and to remain in a higher current consumption mode of the at least two current consumption modes upon detection of the preamble.

As a feature of this aspect of the invention, the microprocessor is configured to operate in at least two current consumption modes and is configured to be placed in a higher current consumption mode upon the wireless signal receiver detecting said preamble. As another feature, the microprocessor is configured to place the wireless signal receiver in a lower current consumption mode and periodically switch the wireless signal receiver to a higher current consumption mode for a duration sufficiently long to detect presence of the preamble. As yet another feature, the DC power supply is a switching mode power supply. As another feature, the control component comprises a triac switch component and the control instruction is a state altering voltage.

In another aspect of the invention, there is provided a control switch device for connection between an AC power supply and a load to be controlled by the control switch device. The control switch device includes a switch control component, a user interface for receiving user activation instructions and output elements for indicating operation status of the control switch device, a microprocessor and a DC power supply. The switch control component having a control input for receiving control instructions to alter switching state of the switch control component to control current supply from the AC power supply to the load.

The microprocessor is operatively connected to the control input of the switch control component for providing said control instructions, and is connected to and responsive to instructions received from the user interface. The microprocessor is configured to operate in at least two current consumption modes. Upon receiving any control instructions from the user interface, the microprocessor operates in a higher current consumption mode to process the user control instructions. The DC power supply drawing an AC current from the AC power supply to convert the AC current to a DC output to power the switch control component, the microprocessor, and the user interface.

In another aspect of the invention, there is provided a control switch device for connection between an AC power supply and a load to be controlled by the control switch device. The control switch device includes a switch control component with a control input for receiving control instructions to alter switching state of the switch control component, a control signal detection circuitry for receiving user activation instructions, a microprocessor, and a switching mode power supply that draws an AC current from the AC power supply to convert the AC current to a DC output to power the switch control component, the microprocessor, and the control signal detection circuitry. The microprocessor is operatively connected to the control input of the switch control component for providing the control instructions and is also connected to the control signal detection circuitry and responsive to instructions received from the control signal detection circuitry. The switch control component controls current supply from the AC power supply to the load in accordance with control instructions from the microprocessor.

In yet another aspect of the invention, there is provided a method of operating a control switch device for connection between an AC power supply and a load to be controlled by the control switch device. The control switch device includes a switch control component for control current supply from the AC power supply to the load, the switch control component being controlled by a microprocessor configured for decoding a control signal received by a wireless receiver from a remote control operated by a user. The method includes the steps of: alternating operation of the wireless receiver in at least two current consumption modes; detecting for a preamble of the control signal when the wireless receiver operates in a higher current consumption mode; upon detection of the preamble, placing the wireless receiver in the higher current consumption mode and continuing detection for remaining portions of the control signal, forwarding detected control signal to the microprocessor for decoding, the microprocessor sending a control instruction to the switch control component to alter switching state of the switch control component to control the current supply from the AC power supply to the load.

As a feature of this aspect of the invention, the microprocessor is configured to operate in at least two current consumption modes and the method further includes the steps of placing the microprocessor in a lower current consumption mode prior to detecting the preamble and placing the microprocessor in a higher current consumption mode upon the wireless signal receiver detecting the preamble.

In other aspects the invention provides various combinations and subsets of the aspects described above and other features and aspects.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The present invention relates to a low current consumption electrical control switch and method related thereto. In general terms, there is provided a very low power switching circuit that is adapted to be used to switch loads such as building lighting circuits and HVAC circuits. According to one embodiment, there is provided an apparatus and method of operating a control switch device by having a switch control component, such as a triac switch control, to switch on and off different types of load and to control power output level of the controlled load. The switch control component is controlled by a microcontroller or microprocessor. The control switch device minimizes its operating current by reducing current consumption of the microcontroller. The control switch device can be controlled wirelessly and includes a wireless signal receiver, such as a radio frequency (RF) receiver, to monitor, detect and receive wireless control signals. The energy consumption of the RF receiver is minimized by placing it in a low energy consumption mode, such as sleep mode, and activating it only periodically to monitor presence of a special preamble of control signal. Upon detection of the preamble, the wireless signal receiver and the microprocessor operates in full power mode or a higher current mode to process and receive remaining portion of control signal. To further reduce its total current consumption, the control switch device converts power from a high AC voltage of the power supply to a DC voltage at a much lower voltage by taking advantage of a switching mode power supply (SMPS).

Figure 1:
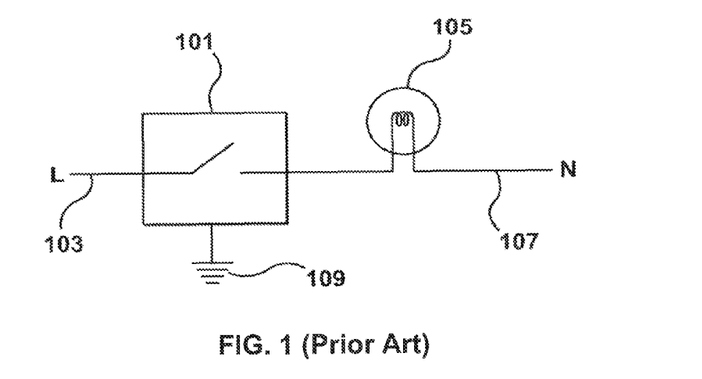
FIG. 1 is an illustration of a typical prior art wall switch, installed in most buildings.

FIG. 1 is an illustration of a typical conventional wall switch installed in most buildings. It consists of a conventional switch 101 having two ends, with one end connected to a live terminal 103 of AC power supply and the other end connected to a load, in this instance, a light bulb 105. Neutral 107 is connected to the other side of the load and is not located inside the wall switch box. Most electrical systems include an earth ground connection 109 to the wall switch box containing the switch 101, mainly for safety considerations and to satisfy electrical code requirements.

According to an embodiment of the present invention, the wall switch 101 is replaced by a control switch device, such as a wall switch module. The control switch device has a very low power consuming control circuit and a rectifier network, connected between the live and load terminals, for converting the AC electrical power to a DC electrical power supply that powers the control circuit, which typically includes a microprocessor, signal receiver, and input and output user interfaces. Current flows from a live terminal 101 through a switching control element, controlled by the microprocessor, and a load, then to the neutral terminal 107. To keep the load practically in an off state, the amount of current flowing through the control switch device and the load is kept below a threshold value, so that the load is not sufficiently energized. As an example, a typical CFL may start flickering when the current flowing through it exceeds 200 µA. Therefore, for a control switch device to work correctly with such a CFL, the amount of current flowing through the control switch device and the load should not exceed 200 µA. This helps determine a threshold current. It is understood that this threshold may vary with different types of load. A current below the threshold current value will be used for the operation of the microprocessor, receiver, input interface such as circuitry connected to switch buttons, and output interface elements such as LED indicators used to display the status of the control switch device. Typical total current consumption for the operation of these elements tends to be above 5 mA. This consumed current is drawn from the AC current flowing through the load. In order to keep the current consumption below the threshold current, it is important to control the source of the incoming current as well as the consumed current as explained below.

Figure 2:
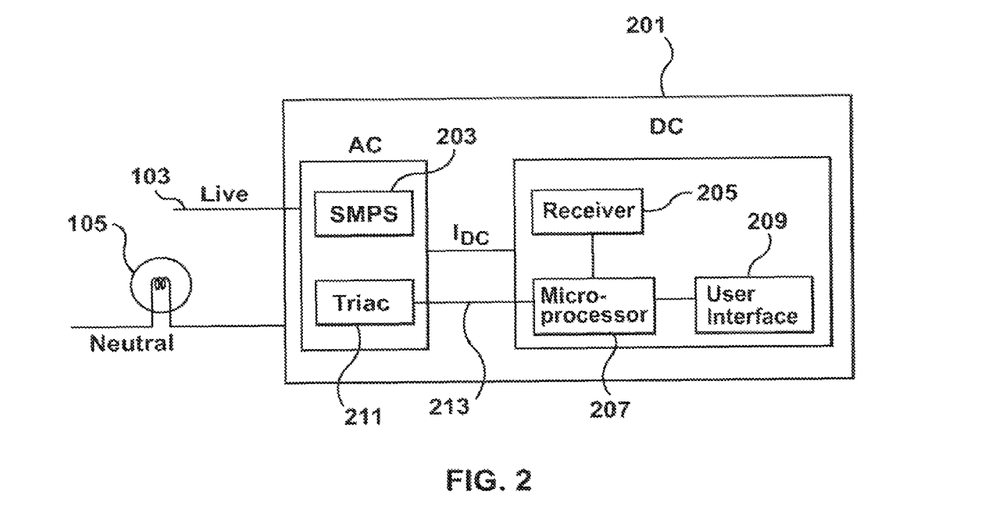
FIG. 2 is a block diagram of a control switch device according to an embodiment of the present invention.

FIG. 2 is a block diagram of a control switch device 201. The external wiring to control switch device 201 may be identical to the wiring to the conventional wall switch 101 with one end of the control switch device connected to the live terminal 103 of AC power supply and the other end connected to the load, such as light bulb 105. This facilitates easy substitution of the control switch device 201 for the conventional wall switch 101.

Control switch device 201 includes several components. They are, but not necessarily limited to, DC power supply such as a switching mode power supply (SMPS) 203, control signal receiver such as RF receiver 205, control processor such as microprocessor 207, user interface 209 and a switch control component, such as triac control 211.

The DC power supply, in this case, SMPS, is connected between the live terminal and the load, thus is able to convert the power supply AC voltage to a DC output with low voltage but higher current $I_{DC}$. In other words, the DC power supply draws an AC current from the AC power supply to convert the AC current to the DC output. The DC output is to power the RF receiver 205, the microprocessor 207, the triac control 211, energy consumption portion of user interface 211, among others. The circuitry of control switch device 201 will need to operate with this current $I_{DC}$. Control signals can be received either through the wireless control signal receiver 205 or through control buttons provided on user interface 209. Both mechanisms provide a control signal receiving and detection circuitry to receive and detect user control signals and for forwarding the control signal to microprocessor for further processing. RF receiver 205 is used to receive wireless control signals from a remote control (not shown) operated by a user, so the load controlled by control switch device 201 can be controlled wirelessly. To control the current conducted through the load, a switch control component such as a triac control 211 is provided and also connected between the load and the live terminal of the AC power supply. The operation or switching state of triac control 211 is controlled by microprocessor 207, through a control input such as gate terminal connection 213. Based on control signal received through the control signal receiving and detection circuitry, microprocessor 207 provides the corresponding control instructions to the switch control component, such as a triggering voltage at a particular phase angle to control and alter the switching state of triac control 211. Controlling and altering the switching state of triac control 211 results in control of current flowing through the load from the AC power supply, thus enabling adjusting a load's power output level or its switching on and off. In addition to controlling a load wirelessly, user interface 209 may be used to manipulate or control microprocessor 207 directly to control the load and to control level of power output by the load. A user can use switch buttons provided by user interface 209 to provide the control signal. Microprocessor 207 is configured to monitor and respond to control commands entered by a user through user interface 209. Microprocessor 207 is also configured to control and manage all other operations, including decoding wireless signals, controlling operation of RF receiver 205, programming another remote control, among others. User interface may also be used to control the operation of the switch, such as to activate the switch device, to control state indicators such as LEDs, or to direct the microprocessor to program another remote control by pressing a "LEARN" button (see FIG. 5).

As mentioned, a control switch device that includes a triac component, a microprocessor, user interface components and other circuitry consumes energy but must draw the required current from an AC current that also flows through the controlled load. Certain minimum DC current, therefore AC current which is converted to the required DC current, must be drawn from the AC power supply. This current must be kept below a threshold value in a standby mode, i.e., when the controlled load is in an off state. Often, the required DC current is such that the controlled load, for example, a CLF, may not be stably kept in an "off" state. It is realized by the inventors that not all energy consuming components need to be powered at 100% of the operating current and at all times in order to keep the control switch device in normal operating condition. For example, it is recognized by the inventors that the wireless receiver tends to consume relatively significant amount of current if kept on all the time. However, the receiver does not need to stay on all the time. It is possible to reduce current consumption of RF receiver, and therefore the wireless control switch device, by keeping the receiver operating only when there is incoming signal. For example, the receiver may be placed in polling operation. During polling operation, the receiver will only operate once in a while, with a predefined operation ratio. To inform the receiver of an incoming signal, a preamble can be built into a transmission protocol. A preamble is a unique identifying signal pattern, encoded with a specific data format. When a receiver is turned on, it looks for this preamble. A receiver is turned on and stays on when the preamble is detected, so that it can receive and decode the rest of the data. At other times, the receiver may be turned off or placed in low current consumption mode to save power and will wait till the next operation cycle. Thus, the receiver alternates between a high current consumption mode and a low current consumption mode (or is turned off) and is in high current consumption made only for a brief period or when the preamble is being detected. By doing so, the overall current consumption may be reduced based on the operation ratio.

Another element that draws current is the microprocessor. The role of the microprocessor is similar to the receiver. It is often believed that the microprocessor needs to be operating at full speed at all times and is often so configured, which leads to high current consumption. To reduce the current consumption, the microprocessor can be placed in sleep mode or operate at a much slower clock speed during standby operation. To use the consumed energy efficiently, it is only woken up by the signal receiver when a valid signal is received (i.e., when the presence of preamble is detected) or when a user tries to activate the wall switch by pressing a switch button, i.e., it runs at full speed only when it receives expected wireless signal from the receiver or when a user activates the wall switch. The microprocessor is running at slower speed or in sleep mode at other times. Thus, the microprocessor also alternates between a higher current consumption mode and a lower current consumption mode and operates in higher current consumption mode only when needed. As a result, the overall current consumption can be reduced significantly.

In addition to controlling DC current consumption, it is recognized by the inventors that total AC current consumption can be reduced as compared to existing devices without negatively affecting the normal operation of a control switch device. One possible source of reduction is from increased conversion efficiency of converting from AC current to DC current. Switching mode power supply (SMPS) is used to convert the incoming energy from a relatively high voltage and low current AC source to a low voltage high current DC source. The incoming voltage is rated at the AC line voltage, which is 120 VAC in North America. As mentioned, 200 µA can be drawn from the AC line without any impact to the load's operation. Therefore, the incoming energy would be 120 VAC at 200 µA. Operating voltage for the wall switch can be as low as 3V. By converting the voltage from 120V to 3V, the current can be increased by the same ratio (or about same if taking into account conversion efficiency). An SMPS tends to have a higher conversion efficiency and is thus suitable for use as a DC power supply for the control switch device.

A control switch device that includes these design elements tends to have a low operating current consumption but still meet normal operation requirements. The following explains how such a switch device is further configured and operates.

Figure 3:
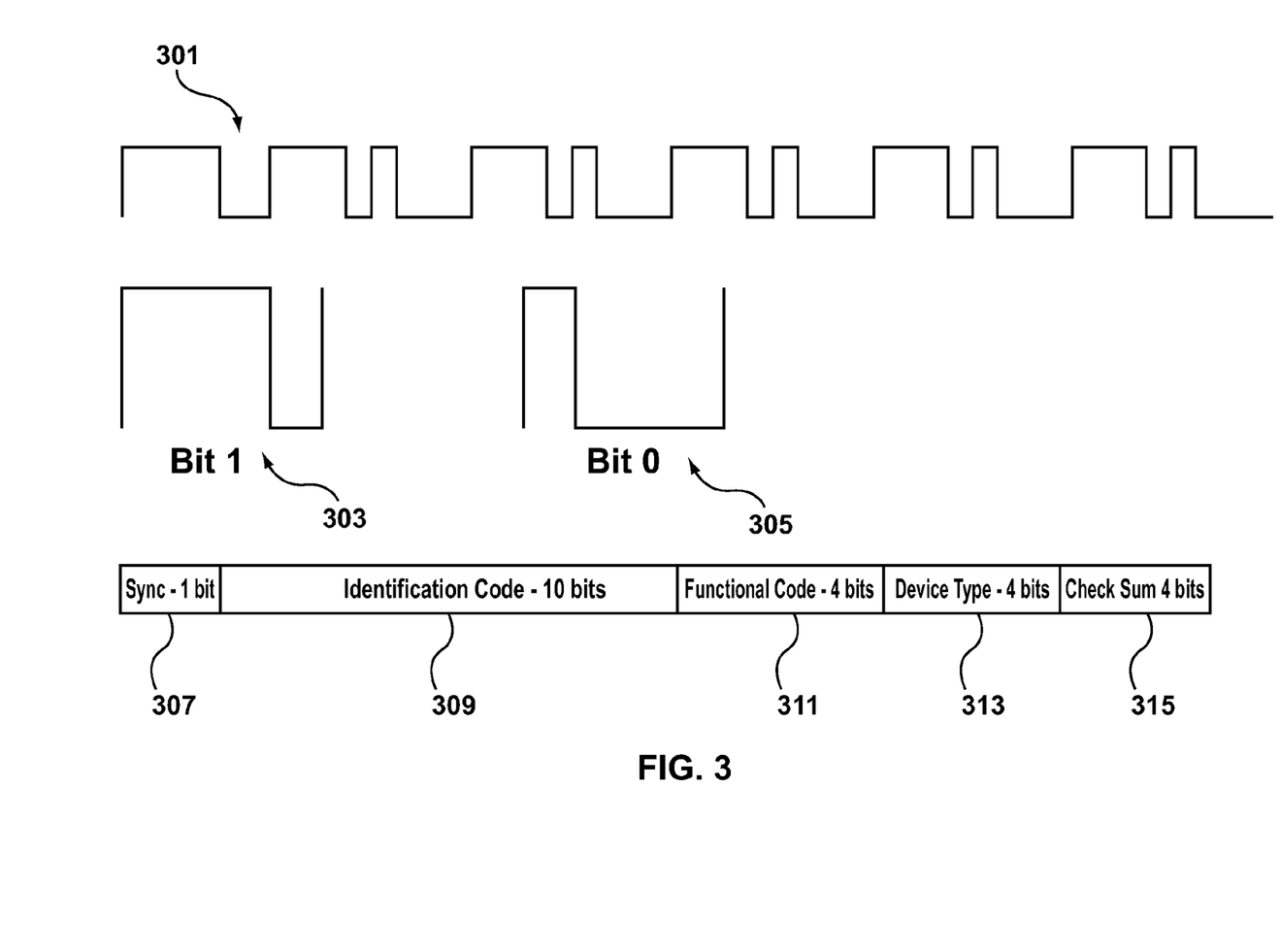
FIG. 3 shows a typical prior art transmission protocol.

FIG. 3 shows a typical conventional transmission protocol 301 without a preamble. This is for encoding a control signal generated and transmitted by a remote control or remote transmitter. A data signal usually consists of 2 bit types, one represents logical high 303, or bit 1, and one represents logical low 305 or bit 0. One complete data signal consists of multiple bits. These bits may include sync bit 307 to inform the receiver of the start of the data signal, transmitter's identity bit 309, function bits of the data signal 311, such as turn lights on or off or dim its brightness, device type bit 313 as well as check sum bit 315 for verification etc. To detect or monitor data signal encoded according to transmission protocol 301, the receiver needs to be on all the times in order to receive this signal. Once the signal is received, microprocessor will decode this signal to see whether further action needs to be taken according to the function bits 311.

Figure 4A:
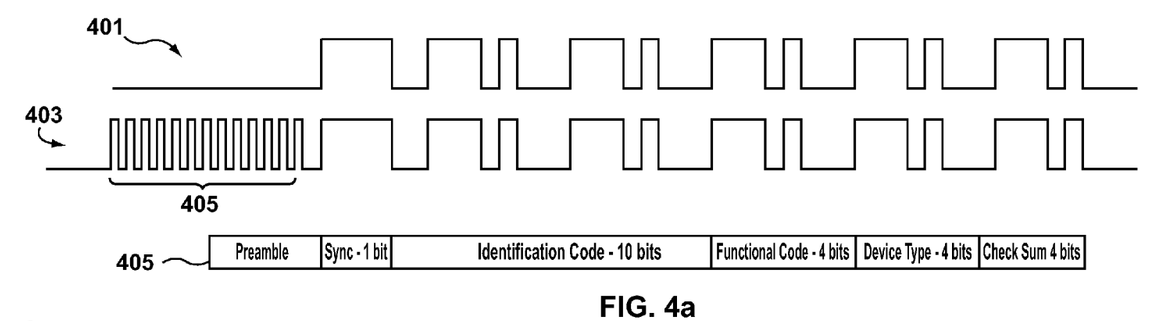
FIG. 4a shows a transmission protocol with a preamble.

FIG. 4a shows a transmission protocol 403 with a preamble 401. Comparing to a transmission protocol without preamble 401, transmission protocol 403 is relatively longer with bits 405 (preamble bits) added at the beginning of the transmission protocol. The preamble bits may be a series of alternating logical high and low bits, with pre-selected, fixed durations. These preamble bits are used as indication to wake up the receiver and enable the receiver to operate in polling mode. Polling mode here refers to an on/off cycle of the receiver in which most of the time the receiver is in an off state in order to reduce overall current consumption and is only turned on, i.e., awake, briefly during the cycle. The receiver is configured to detect the presence of the preamble bits when the receiver is awake. If preamble bits are received, it will continue to operate in order to receive the rest of the transmission protocol. If no preamble bits are received, it returns to sleep mode in order to save power.

Figure 4B:
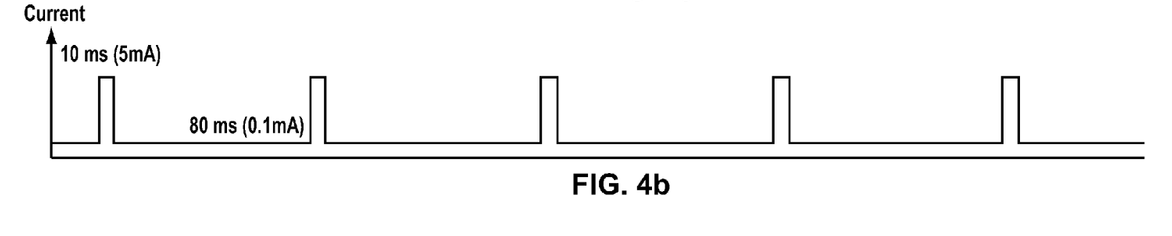
FIG. 4b shows the receiver operating in polling mode.
Figure 4C:
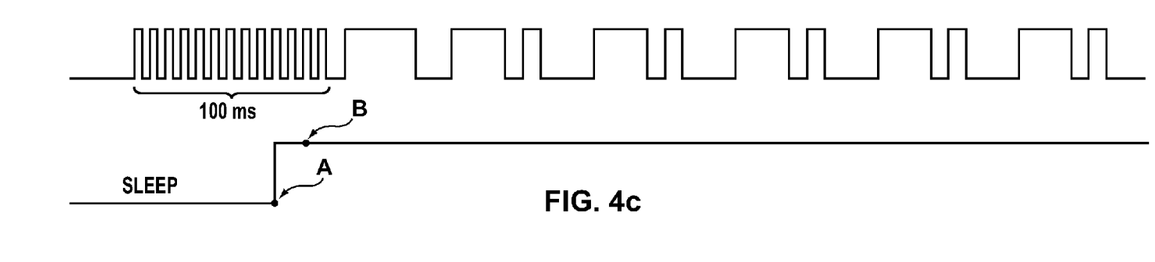
FIG. 4c illustrates a wireless receiver receiving multiple preamble bits when awaken and therefore staying awake to decode the rest of the signal.

FIG. 4b shows one specific example of the receiver operating in polling mode to illustrate this. During operation, a receiver may draw a current of about 5 mA. When in sleep mode, the current consumption may be less than 0.1 mA. In this example, receiver operates for 10 milliseconds (wakes up for 10 ms) and then it will stop operating for 80 ms (sleeps for 80 ms), to reduce the overall current consumption. Here, the duty cycle is 1:8. The current consumption is around ⅛ of the total operating current when operating all the time. In order to ensure the receiver can receive the preamble while it is awake, the preamble bits must be long enough to cover the whole duty cycle, i.e. 10 ms+80 ms=90 ms. For a preamble in the transmission protocol that is 100 ms long, i.e., longer than 90 ms, the receiver is able to receive at least a portion of the preamble bits when it is awake. To avoid falsely woken up by radio frequency noises in surrounding environment, the receiver may be configured to require certain specific requirements be met before it will stay on. For example, it may require that certain number of consecutive preamble bits must be received in order to wake up the receiver. This requires the receiver to be on sufficiently long during each duty cycle so that a pre-determined number of consecutive preamble bits (e.g., 3) may be detected when the receiver is awake. This avoids the receiver to be woken up by signals other than the preamble bits. FIG. 4c illustrates when the receiver is awake at time A, it receives multiple preamble bits. As a result, the receiver stays awake to decode the rest of the signal, instead of returning to sleep mode at time B.

As noted, besides the receiver, it is recognized by the inventors that microprocessor may be another element that draws significant current but normal operation of the control switch device may be possible with its total current consumption reduced. The functions of the microprocessor include: 1) decode radio signal so when a remote control is activated, it can respond accordingly, 2) control the load, e.g., to control output power level of the load or to turn it on or off, 3) respond to user manipulation of user interface, such as its buttons, so when a user tries to activate the control switch device directly through the user interface, it can respond to that action. Therefore, when the wall switch device is in standby mode, it should be ready to respond to control signal received wirelessly and control signal from its user interface buttons. Typically, no other actions need to be performed in standby mode. In order to save power, the microprocessor can run at a much slower clock frequency, or even go into sleep mode during standby. By running at a slower clock (operating) frequency, the current consumption can be significantly reduced. For example, some typical operating frequency of a microprocessor for this type of application runs at 8 MHz to 16 MHz. This is the usual clock frequency that is used during full operation. When the unit is in standby mode, it is only expecting RF signal and wall switch button signals. Therefore, a much slower sub-clock frequency can be used for monitoring these input signals. The microprocessor can run at full speed when the receiver receives expected preamble bits or detects a wall switch button signal. In addition to running at slower clock, microprocessor can also be put into sleep mode, and be woken up by specific inputs. For example, it can be woken up if the receiver receives valid preamble bits, or when the wall switch button is pressed by the user.

Figure 5:
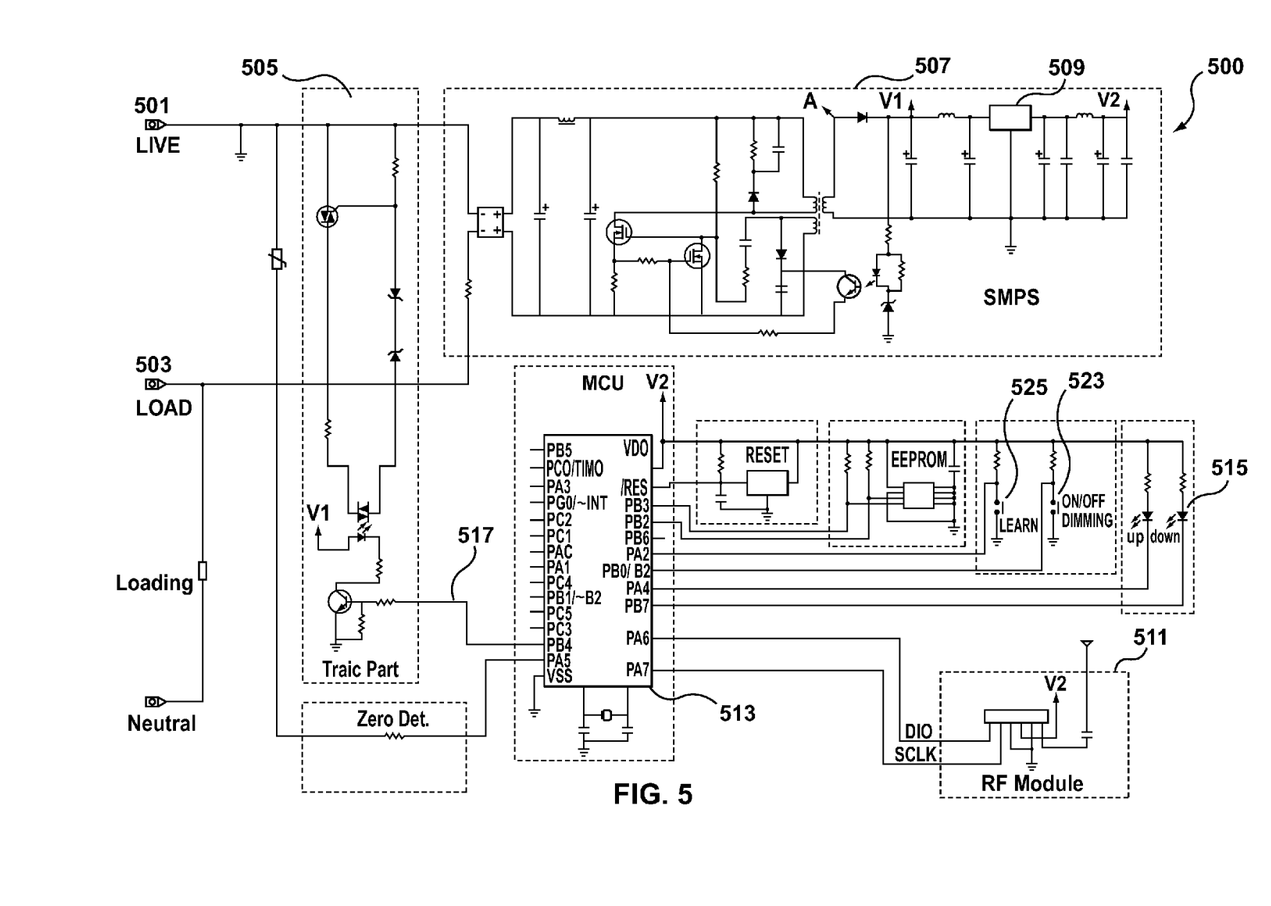
FIG. 5 is a schematic of a control switch device according to an embodiment of the present invention.

FIG. 5 is a schematic of a control switch device 500 according to another embodiment. The control switch device has a live terminal 501 and a load terminal 503, for replacing a conventional switch connected to AC power supply. Typically, household AC power supply is rated at 110V AC in some countries, 220V AC in other countries, and some other rated voltage at yet other countries or in other applications. For this example, it is assumed that the maximum current flow of 200 µA is measured at 110V AC, meaning the maximum power drawn is 110V times 200 µA, that is 0.22 W. This is the maximum power which can be drawn from the AC line without any negative impact to the load. This AC current is converted by a DC power supply 507 to a low voltage DC current. As mentioned, this power drawn from the AC line is used for operating a wireless signal receiver 511 and microprocessor 513. These devices operate at a low DC voltage, typically at 3.3 VDC. A switch mode power supply can be used to convert the high voltage and low current AC input to a low voltage and high current DC output suitable for operating the wireless signal receiver 511 and the microprocessor 513. Assuming there is no loss, the maximum output current at low voltage such as 3.8 VDC will be 110V×200 µA/3.8V=5.8 mA. Assuming the efficiency of the switching mode power supply is 70%, the output current is at around 4 mA. This is usually adequate for operating the receiver 511 and microprocessor 513. This voltage may be further regulated by a voltage regulator 509 to a more stable 3.3 VDC output, which will then be supplied to the rest of the circuitry, including the receiver 511 and microprocessor 513. In addition, other components of the control switch device, such as LEDs 515 of user interface, also draw current from this DC output.

Referring to FIG. 5, microprocessor 513 may be programmed to control the operation of receiver 511, in particular, to operate the receiver in polling mode. This may be achieved by sending a control signal to the receiver over SCLK line to wake up the receiver periodically. The receiver 511 monitors and receives any wireless control signal when awake. Wireless control signals 403 received by the receiver 511 are forwarded to the microprocessor 513 over a data link such as DIO line (data input output pin) for processing and decoding. When the expected preamble is detected, both the microprocessor and the receiver will be switched to full power mode to detect and process the remaining data bits of the control signal. Initial detection for the preamble 403 may be performed by the receiver 511, upon detection of which, the receiver will remain on and the microprocessor will be kept at full power mode. Alternatively, only clock signals are sent to the receiver over SCLK line and the receiver 511 itself is programmed to operate in polling mode utilizing the clock signal (e.g., wake up every 8 clock signals for a 1:8 duty cycle polling mode). When awake, the receiver monitors and detects for presence of the preamble. The receiver is configured to remain on and to cause the microprocessor 513 running at full speed upon detection of the expected preamble.

Control data signals received by the receiver is processed and decoded by the microprocessor. If the control data includes user command to adjust power output level, for example, to dim the light, or to switch on or off the load, a control instruction is provided to the triac control through an electrical connection 517 between the microprocessor 513 and the triac control 505. For a triac control, the control instructions may be a state altering voltage that is used to alter the switching state of the triac control, thus controlling the current flowing through the load.

As shown in FIG. 5, a user may also operate an on/off switch 523 provided on the casing or face plate (not shown) of the switch device to adjust the brightness of a CFL or to switch it on or off. A LEARN button 525 is also provided to enable a user to operate the LEARN button to program another remote control. These additional control buttons of user interface enable direct control of the control switch device, in addition to using a remote control.

As will be appreciated, although a switch control device is described with reference to one that includes a wireless signal receiver, a switch control device does not always require to be operated wirelessly. For example, a wall switch device may not have a wireless receiver 511 like the wall switch device depicted in FIG. 5 but is otherwise identical thereto. A user operates a wall switch device of such an alternative embodiment directly using the switch control buttons provided by the user interface. For example, a user may operate directly an on/off switch 523 provided on the casing or face plate (not shown) of the switch device to adjust the brightness of a load such as a CFL or to switch it on or off. The microprocessor is still put into sleep mode or running at a slower clock frequency when the switch is in standby mode, to reduce energy and therefore current consumption. Similarly, the microprocessor of such a control switch is also configured, i.e., programmed, to wake up or operate at full speed when a user presses the on/off switch.

Various embodiments of the invention have now been described in detail. Those skilled in the art will appreciate that numerous modifications, adaptations and variations may be made to the embodiments without departing from the scope of the invention. Since changes in and or additions to the above-described embodiments may be made without departing from the nature, or scope of the invention, the invention is not to be limited to those details but only by the appended claims.

What is claimed is:

1. A control switch device for connection between an alternating current (AC) power supply and a load to be controlled by said control switch device, said control switch device comprising:
   a switch control component, said switch control component having a control input for receiving control instructions to alter switching state of said switch control component to control current supply from said AC power supply to the load,
   a microprocessor, said microprocessor being operatively connected to said control input of said switch control component for providing said control instructions,
   a wireless signal receiver for receiving a control signal, said control signal consisting of a preamble portion and a message portion, said preamble consisting of a data pattern, free of said control instructions, said message portion consisting of pre-arranged data bits encoded with one or more said control instructions, said wireless signal receiver being configured to alternate between at least two current consumption modes and to remain in a higher current consumption mode of said at least two current consumption modes for receiving remainder of said control signal upon detection of said data pattern of said preamble in said higher current consumption mode, and a direct current (DC) power supply connected between the AC power supply and the load, said DC power supply drawing from said AC power supply an AC current that passes through the load and converting said AC current to a DC output to power said wireless signal receiver, said microprocessor and said switch control component, said AC current being below a pre-configured threshold value when said switch control component is in an off switching state.

2. The control switch device of claim 1, wherein said microprocessor is configured to operate in at least two current consumption modes and is configured to be placed in a higher current consumption mode for processing the remainder of said control signal upon said wireless signal receiver detecting said preamble.

3. The control switch device of claim 1, wherein said microprocessor is configured to place said wireless signal receiver in a lower current consumption mode and periodically switch said wireless signal receiver to a higher current consumption mode for a duration sufficiently long to detect presence of said preamble.

4. The control switch device of claim 1, wherein said DC power supply is a switching mode power supply.

5. The control switch device of claim 1, wherein said control component comprises a triac switch component and said control instruction is a state altering voltage.

6. The control switch device of claim 1, wherein said wireless signal receiver is a radio frequency receiver.

7. A control switch device for connection between an alternating current (AC) power supply and a load to be controlled by said control switch device, said control switch device comprising:
a switch control component, said switch control component having a control input for receiving control instructions to alter switching state of said switch control component to control current supply from said AC power supply to the load,
a user interface having user input elements for receiving user activation instructions that include said control instructions and output elements for indicating operation status of the control switch device,
a microprocessor, said microprocessor being operatively connected to said control input of said switch control component for providing said control instructions to alter the switching state of said switch control component, said microprocessor being connected to and responsive to instructions received from the user interface, said microprocessor being configured to operate in at least two current consumption modes and being configured to operate in a higher current consumption mode upon receiving any control instructions from said user interface, a wireless signal receiver for receiving a control signal, said control signal consisting of a preamble portion consisting of a data pattern, free of said control instructions, and a message portion consisting of pre-arranged data bits encoded with one or more said control instructions, said wireless signal receiver being configured to alternate between at least two current consumption modes, not to receive the control signal when in a lower current consumption mode of said at least two current consumption modes, and to detect said preamble in a higher current consumption mode of said at least two current consumption modes and to remain in the higher current consumption mode of said at least two current consumption modes upon detection of said data pattern of said preamble to receive remainder of the control signal, and said microprocessor being configured to decode said control signal and to operate in the higher current consumption mode of the microprocessor upon detecting said preamble; and a direct current (DC) power supply connected between the AC power supply and the load, said DC power supply drawing from said AC power supply an AC current and converting said AC current to a DC output to power said switch control component, said microprocessor, and said user interface, said AC current being below a pre-configured threshold value when said switch control component is in an off switching state.

8. The control switch device of claim 7, wherein said DC power supply is a switching mode power supply.

9. The control switch device of claim 7, wherein said control component comprises a triac switch component and said control instruction is a state altering voltage.

10. The control switch device of claim 7, wherein said user interface comprises at least one user input button.

11. The control switch device of claim 7 wherein the microprocessor is configured to provide said control instructions decoded from said control signal to said switch control component.

12. The control switch device of claim 7 wherein the wireless signal receiver is a radio frequency signal receiver.

13. A method of operating a control switch device for connection between an alternating current (AC) power supply and a load to be controlled by said control switch device, said control switch device comprising a switch control component for control current supply from said AC power supply to the load, said switch control component being controlled by a microprocessor configured for decoding a control signal received by a wireless receiver from a remote control operated by a user, said control signal comprising a message portion consisting of pre-arranged data bits encoded with a control instruction to alter the switching state of the switch control component and a preamble preceding the message portion, the preamble consisting of a data pattern, free of any control instructions, the method comprising:
drawing from said AC power supply an AC current that passes through the load and that is below a pre-configured threshold value when said switch control component is in an off switching state, and converting the AC current to a DC output to power said switch control component, said microprocessor, and said user interface,
alternating operation of the wireless receiver in at least two current consumption modes,
detecting for the data pattern of the preamble of the control signal when the wireless receiver operates in a higher current consumption mode,
upon detection of the data pattern of the preamble,
placing the wireless receiver in the higher current consumption mode and continuing detection for remainder of the control signal,
forwarding detected control signal to the microprocessor for decoding the control instructions,
the microprocessor sending the control instructions to the switch control component to alter switching state of the switch control component to control the current supply from said AC power supply to the load.

14. The method of claim 13, wherein the microprocessor is configured to operate in at least two current consumption modes, the method further comprising:

placing the microprocessor in a lower current consumption mode prior to detecting said preamble and placing the microprocessor in a higher current consumption mode upon said wireless signal receiver detecting said preamble.

15. The control switch device of claim 1, wherein the wireless signal receiver is configured not to receive the control signal when in the lower current consumption mode, and to detect said preamble in the higher current consumption mode and to remain in said higher current consumption mode for receiving the remainder of the control signal upon detection of said preamble to receive the control signal.

\* \* \* \* \*